(12) United States Patent
Shum et al.

(10) Patent No.: US 12,417,140 B1
(45) Date of Patent: Sep. 16, 2025

(54) PROBLEM FIX VERIFICATION GENERATION

(71) Applicant: International Business Machines Corporation, Armonk, NY (US)

(72) Inventors: Stephanie Carys Shum, Wappingers Falls, NY (US); Patrick John Clas, Pine Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/736,156

(22) Filed: Jun. 6, 2024

(51) Int. Cl.
*G06F 11/07* (2006.01)

(52) U.S. Cl.
CPC ........ *G06F 11/0793* (2013.01); *G06F 11/079* (2013.01)

(58) Field of Classification Search
CPC .......................... G06F 11/079; G06F 11/0793
See application file for complete search history.

(56) References Cited

U.S. PATENT DOCUMENTS

| | | |
|---|---|---|
| 6,978,440 B1 | 12/2005 | Pavela |
| 9,779,013 B2 | 10/2017 | Narayan et al. |
| 10,540,267 B2 | 1/2020 | Wojciak et al. |
| 11,086,754 B2 | 8/2021 | Bhide et al. |
| 11,093,320 B2 | 8/2021 | Reed et al. |
| 11,809,845 B2 | 11/2023 | Saha |
| 2012/0151448 A1 | 6/2012 | Becker et al. |
| 2016/0162346 A1* | 6/2016 | Kushnir ................ G06F 11/079 714/37 |
| 2019/0087311 A1* | 3/2019 | Donaldson .......... G06F 11/3688 |
| 2019/0171552 A1 | 6/2019 | Mitchell et al. |
| 2021/0326245 A1 | 10/2021 | Arbon et al. |
| 2022/0318130 A1 | 10/2022 | Kumar et al. |
| 2023/0125904 A1 | 4/2023 | Willett et al. |
| 2023/0376758 A1* | 11/2023 | Chen ..................... G06N 3/0455 |
| 2024/0097971 A1* | 3/2024 | Harsh ................... H04L 41/122 |

FOREIGN PATENT DOCUMENTS

| | | |
|---|---|---|
| CN | 108319575 A | 7/2018 |
| CN | 110471838 A | 11/2019 |
| CN | 113590472 A | 11/2021 |
| CN | 114328226 A | 4/2022 |
| NL | 2029881 A | 7/2022 |

* cited by examiner

*Primary Examiner* — Jigar P Patel
(74) *Attorney, Agent, or Firm* — Patterson + Sheridan, LLP (57) ABSTRACT

Methods and apparatus for generating problem fix verification procedures for varying corrections to defects are described. An example method includes obtaining problem analysis data associated with a defect of a first computing system. A first representational vector corresponding to the problem analysis data is generated. Second representational vectors corresponding to respective historical defects associated with one or more second computing systems are obtained. A set of historical problem fix verification procedures associated with the defect is determined, based on the first representational vector and at least one of the second representational vectors. A recommended set of problem fix verification procedures for verifying a correct to the defect of the first computing system is provided to a third computing system. The recommended set of problem fix verification procedures include the ranked set of historical problem fix verification procedures.

20 Claims, 6 Drawing Sheets

PROBLEM FIX VERIFICATION GENERATION

BACKGROUND

The present disclosure generally relates to error analysis, and more specifically, to methods, apparatus, and systems for generating problem fix verification procedures for verifying corrections to defects.

Computing environments (which may include any number and combination of systems, such as cloud-based systems, mainframe computing systems, terminals or control systems, and the like) are generally capable of encountering a wide variety of defects (e.g., software errors and/or hardware errors) during normal (or abnormal) operations. The particular defects encountered may vary significantly depending on the architecture and operations being performed, and at times it can be exceedingly difficult to identify the root cause and/or to correct the defects.

For defects that are not readily identifiable and/or repairable, a developer associated with the computing environment may be tasked with identifying and correcting the defect. After correcting the defect, the developer may determine a set of instructions (or steps) for verifying that the defect has been corrected. The developer may then communicate the set of instructions to a fix verification agent to use to verify that the defect has been corrected.

SUMMARY

One embodiment presented in this disclosure is a computer-implemented method. The computer-implemented method includes obtaining problem analysis data associated with a defect of a first computing system. The computer-implemented method also includes generating a first representational vector corresponding to the problem analysis data. The computer-implemented method also includes obtaining a plurality of second representational vectors corresponding to a respective plurality of historical defects associated with one or more second computing systems. The computer-implemented method further includes determining a set of historical problem fix verification procedures associated with the defect, based on the first representational vector and at least one of the plurality of second representational vectors, each historical problem fix verification procedure of the set of historical problem fix verification procedures indicating a respective set of instructions for verifying a correction to at least one of the plurality of historical defects. The computer-implemented method further includes ranking the set of historical problem fix verification procedures, based at least in part on at least one metric associated with the first representational vector and the at least one of the plurality of second representational vectors. The computer-implemented method further includes providing, to a third computing system, an indication of a recommended set of problem fix verification procedures for verifying a correction to the defect of the first computing system, the recommended set of problem fix verification procedures comprising the ranked set of historical problem fix verification procedures.

Another embodiment presented in this disclosure is a first computing system. The first computing system includes one or more memories collectively storing executable instructions, and one or more processors communicatively coupled to the one or more memories. The one or more processors are collectively configured to execute the executable instructions and cause the first computing system to perform an operation. The operation includes obtaining problem analysis data associated with a defect of a second computing system. The operation also includes generating a first representational vector corresponding to the problem analysis data. The operation also includes obtaining a plurality of second representational vectors corresponding to a respective plurality of historical defects associated with one or more third computing systems. The operation also includes determining a set of historical problem fix verification procedures associated with the defect, based on the first representational vector and at least one of the plurality of second representational vectors, each historical problem fix verification procedure of the set of historical problem fix verification procedures indicating a respective set of instructions for verifying a correction to at least one of the plurality of historical defects. The operation further includes ranking the set of historical problem fix verification procedures, based at least in part on at least one metric associated with the first representational vector and the at least one of the plurality of second representational vectors. The operation further includes providing, to a fourth computing system, an indication of a recommended set of problem fix verification procedures for verifying a correction to the defect of the second computing system, the recommended set of problem fix verification procedures comprising the ranked set of historical problem fix verification procedures.

Another embodiment presented in this disclosure is a computer-readable storage medium. The computer-readable storage medium has computer-readable program code embodied therewith. The computer-readable program code is collectively executable by one or more computer processors to perform an operation. The operation includes obtaining problem analysis data associated with a defect of a first computing system. The operation also includes generating a first representational vector corresponding to the problem analysis data. The operation also includes obtaining a plurality of second representational vectors corresponding to a respective plurality of historical defects associated with one or more second computing systems. The operation also includes determining a set of historical problem fix verification procedures associated with the defect, based on the first representational vector and at least one of the plurality of second representational vectors, each historical problem fix verification procedure of the set of historical problem fix verification procedures indicating a respective set of instructions for verifying a correction to at least one of the plurality of historical defects. The operation further includes ranking the set of historical problem fix verification procedures, based at least in part on at least one metric associated with the first representational vector and the at least one of the plurality of second representational vectors. The operation further includes providing, to a third computing system, an indication of a recommended set of problem fix verification procedures for verifying a correction to the defect of the first computing system, the recommended set of problem fix verification procedures comprising the ranked set of historical problem fix verification procedures.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; and a computer program product embodied on a computer-readable storage medium comprising code for performing the aforementioned methods as well as those further described herein.

The following description and the related drawings set forth in detail certain illustrative features of one or more embodiments.

DETAILED DESCRIPTION

Error analysis and correction of defects in a computing environment may involve a fix verification agent utilizing a fix verification procedure (including a set of fix verification instructions) provided by a developer to verify that a defect (e.g., software error, hardware error, or a combination thereof) associated with a computing system has been corrected. One challenge associated with this process of verifying defects is that, in some cases, the fix verification procedure provided by the developer may be insufficient for verifying that the defect has been properly corrected.

In some cases, for example, the fix verification procedure may be incomplete due to, e.g., a lack of knowledge the developer may have regarding applications/services provided by the computing system in a production environment. Additionally or alternatively, in some cases, the fix verification procedure may assume the fix verification agent has access to tools that the fix verification agent either cannot use or does not have knowledge of. For instance, the fix verification agent may interact with the computing system in a production environment (or client-facing environment) (e.g., in a manner that a client or user would interact with the computing system), whereas the developer may interact with the computing system in a development and/or staging environment. Thus, a fix verification agent in a production environment may not have access to the same tools that the developer has access to in a development/staging environment.

In some cases, the insufficiency of the fix verification procedure may lead to further interaction between the developer and fix verification agent, resulting in additional support cost and additional customer downtime while the fix verification procedure is updated and the correction to the defect is verified.

Embodiments described herein provide techniques and systems for generating problem fix verification procedures in computing environments. In certain embodiments, a problem fix verification component is configured to generate a set of problem fix verification procedures based on analyzing problem analysis data and historical problem analysis data with one or more rules-based techniques, machine learning techniques, or a combination thereof.

As described below, the problem fix verification component may obtain problem analysis data associated with a defect (or problem), such as a software or hardware error, that arises related to a service or program provided by a computing system. The problem analysis data may include information related to the defect, including its error reference code, the component that the defect originates from, the agent that the defect is assigned to for error analysis, and communications between agents (e.g., customer, service provider, developer, fix verification agent, etc.) associated with the defect, as illustrative, non-limiting examples. In some cases, the problem analysis data may be automatically collected in one or more files by the computing system and/or one or more agents during execution of the service or program.

As described in greater detail below, the problem fix verification component may determine a set of historical defects associated with (e.g., similar to) the current defect, based on metrics indicating a level of similarity between the defect and the set of historical defects. After determining the set of historical defects, the problem fix verification component may obtain a respective representational vector for each historical defect. The problem fix verification component may generate a representational vector corresponding to the problem analysis data, e.g., using a vectorization technique. The problem fix verification component may compare the generated representational vector to the representational vectors associated with the historical defects. Based on the comparison, the problem fix verification component may determine a subset of the representational vectors associated with the historical defects, each being within a threshold distance to the representational vector corresponding to the problem analysis data. The problem fix verification component may determine a respective historical fix verification procedure (including a set of historical fix verification instructions) corresponding to each representational vector in the subset, and use the historical fix verification procedures as recommended fix verification procedures for verifying the current defect. The problem fix verification component may provide an indication of the recommended fix verification procedures to a computing system associated with the developer. In this manner, the developer may select one of the recommended fix verification procedures and send an indication of the selected fix verification procedure to a computing system associated with the fix verification agent.

In some cases, as described in greater detail below, the problem fix verification component may rank the recommended fix verification procedures based on (i) the distances of their corresponding representational vectors to the representational vector corresponding to the problem analysis data, (ii) feedback from the developer, (iii) feedback from the fix verification agent, or (iv) any combination thereof. For example, the problem fix verification component may adjust one or more weights used for ranking the fix verification procedures, based on the distances, feedback from the developer, feedback from the fix verification agent, or any combination thereof.

In certain embodiments, while a developer is in the process of determining a current fix verification procedure for verifying that a defect has been corrected, the problem fix verification component, using one or more techniques described herein, may provide information indicating (i) one or more historical defects associated with the defect (e.g., similar to the defect), (ii) one or more historical fix verification procedures corresponding to the one or more historical defects, or (iii) any combination thereof, on a user interface of a computing system associated with the developer. As such, embodiments herein allow the developer to use the information as part of the process of determining the current fix verification procedure. The problem fix verification component can monitor which information the developer uses as part of the process of determining the current fix verification procedure, feedback from the developer regarding the recommended fix verification procedures, feedback from the fix verification agent regarding the current fix verification procedure, or a combination thereof, and update the information for a subsequent determinations of fix verification procedures, based on the monitoring.

Advantageously, various embodiments described herein can minimize or eliminate the need for a fix verification agent and developer to send "more information" requests to each other to resolve the fix verification procedure used to verify that a defect has been properly corrected. By minimizing the need for "more information" requests, various embodiments can significantly improve the error analysis process. For example, embodiments can mitigate or avoid the amount of time in which the computing system is offline (and, in turn, the customer downtime) while the correction to the defect is verified. Additionally, embodiments can substantially reduce the compute resources of the error analyzing system(s), e.g., by reducing memory usage, processor time, power consumption, heat generation, and the like (as compared to conventional solutions that may involve frequent back and forth communications between the developer and fix verification agent).

As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Example Computing Environment

Figure 1:
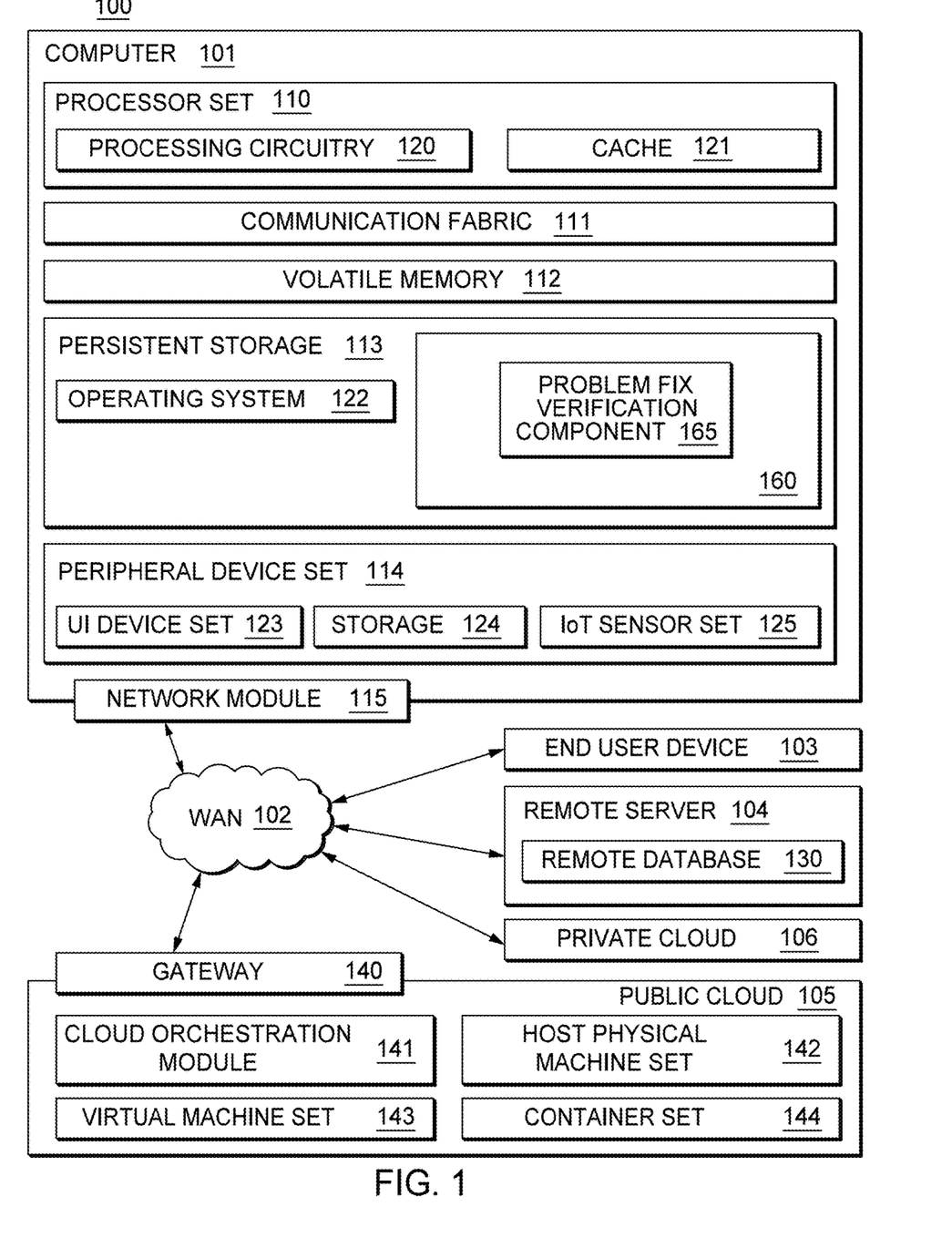
FIG. 1 depicts an example computing environment for the execution of at least some of the computer code involved in performing the inventive methods.

FIG. 1 depicts an example computing environment for the execution of at least some of the computer code involved in performing the inventive methods.

Computing environment 100 contains an example of an environment for the execution of at least some of the computer code involved in performing the inventive methods, such as block 160, which includes problem fix verification component 165 configured to generate problem fix verification procedures for verifying corrections to defects.

In addition to block 160, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 160, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 160 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 160 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Note, to clearly point out novel features of the present invention, the following discussion omits or only briefly describes conventional features of data processing systems which are apparent to those skilled in the art. It may be noted that a numbered element is numbered according to the figure in which the element is introduced, and is referred to by that number throughout succeeding figures.

Figure 2:
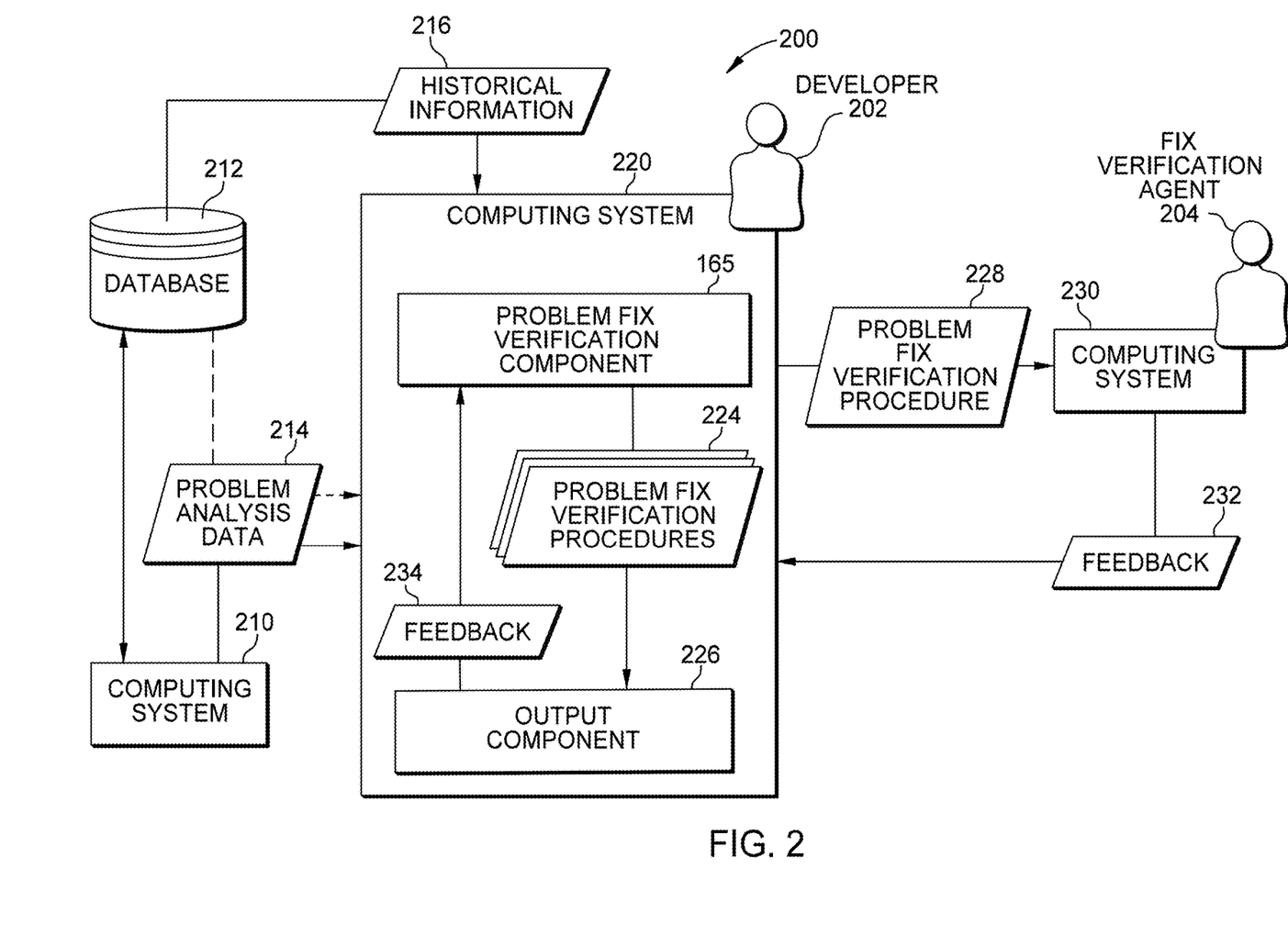
FIG. 2 depicts an example system for generating problem fix verification procedures for verifying corrections to defects, according to various embodiments of the present disclosure.

Example System for Generating Problem Fix Verification Procedures in a Computing Environment FIG. 2 depicts an example system 200 for generating problem fix verification procedures for verifying corrections to defects, according to various embodiments of the present disclosure. As shown, the system 200 includes, without limitation, a computing system 210, a database 212, a computing system 220 associated with a developer 202, and a computing system 230 associated with a fix verification agent 204.

The computing system 210, computing system 220, and computing system 230 are generally representative of a variety of computing systems, such as laptops, servers, and desktops, as illustrative examples. In some embodiments, one or more of the computing system 210, computing system 220, and computing system 230 (including one or more components thereof) are located in (or otherwise accessible via) a cloud computing environment. The computing systems 210, 220, and 230 may be implemented using hardware, software, or a combination of hardware and software. The database 212 is representative of one or more storage systems used to store information associated with current defects, historical defects, or a combination thereof. The database 212 may be implemented using hardware, software, or a combination of hardware and software. In some embodiments, the database 212 is located in (or otherwise accessible via) a cloud computing environment.

As shown in FIG. 2, if the computing system 210 encounters any defects (e.g., hardware error, software error, or a combination thereof) during its operations, the computing system 210 may generate the problem analysis data 214 associated with the defect(s). Generally, the problem analysis data 214 may include, without limitation, a reference code (referred to in some embodiments as error codes or refcodes) that indicates what defect occurred, the component that the defect originates from, the agent that the defect is assigned to for error analysis, communications between agents, (e.g., customer (or end-user), service provider, developer 202, fix verification agent 204, etc.), and any combination thereof. In some embodiments, the computing system 210 may include, within the problem analysis data 214, additional information retrieved from an error log database, such as database 212. The additional information may include an indication of comments from one or more defects linked to the current defect (e.g., "comments in linked defects"), an indication of areas (e.g., hardware regions) of the computing system 210 where the defect is located (e.g., "filed against areas), an indication of an error analysis agent and/or error analysis team assigned to evaluate the defect (e.g., "assigned to who"), an indication of one or more tags or keywords associated with the defect, or a combination thereof.

In certain embodiments, the computing system 210 provides the problem analysis data 214 to the computing system 220 associated with the developer 202. Alternatively, in certain embodiments, the computing system 210 stores the problem analysis data 214 within the database 212, and the computing system 220 accesses the database 212 to retrieve the problem analysis data 214. In yet other embodiments, the computing system 210 provides one or more portions of the problem analysis data 214 to the computing system 220, and the computing system 220 obtains one or more remaining portions of the problem analysis data 214 from the database 212.

As also shown, the computing system 220 may obtain historical information 216 from the database 212. The historical information 216 generally includes information associated with one or more historical defects (e.g., historical software errors, historical hardware errors, or combinations thereof) associated with the computing system 210, one or more other computing systems, or combinations thereof. For example, the historical information 216 can include, for a given historical defect, an indication of a historical reference code corresponding to the historical defect, the component within a computing system that the historical defect originates from, the agent that the historical defect was assigned to for error analysis, one or more communications between agents associated with the historical defect, or any combination thereof. Additionally, in certain embodiments, the historical information 216 also includes, for a given historical defect, an indication of comments from one or more other historical defects linked to the historical defect (e.g., "historical comments in linked defects"), an indication of areas (e.g., hardware regions) of the computing system where the historical defect is located (e.g., "historical filed against areas), an indication of an error analysis agent and/or error analysis team assigned to evaluate the historical defect (e.g., "historical assigned to who"), an indication of one or more tags or keywords associated with the historical defect, or a combination thereof. Additionally, in certain embodiments, the historical information 216 also includes, for a given historical defect, a historical representational vector associated with the historical defect. The historical representational vector may be generated based on vectorising one or more of the aforementioned information associated with the historical defect (e.g., within historical information 216), using a vectorization algorithm, such as bag of words, term frequency-inverse document frequency (TF-IDF), and word2vec, as illustrative, non-limiting examples.

The computing system 220 includes the problem fix verification component 165 and an output component 226. The problem fix verification component 165 is generally configured to generate one or more recommended problem fix verification procedures 224 to be used for verifying the current defect of the computing system 210, based on the problem analysis data 214, historical information 216, or any combination thereof. The problem fix verification component 165 may provide the one or more recommended problem fix verification procedures 224 to the output component 226. The output component 226 may provide an indication of the one or more recommended problem fix verification procedures 224 (along with comments and other information associated with the recommended problem fix verification procedures) on a user interface of the computing system 220. For example, as noted, in certain embodiments, the output component 226 may provide the indication of the one or more recommended problem fix verification procedures 224 on the user interface of the computing system 220 while the developer 202 is in the process of generating a problem fix verification procedure 228 for verifying a correction to the current defect of the computing system 210.

In certain embodiments, the output component 226 provides feedback 234 regarding the recommended problem fix verification procedures 224 to the problem fix verification component 165. For example, in some embodiments, the output component 226 prompts the developer 202 to provide explicit feedback on the recommended problem fix verification procedures 224. Such explicit feedback may include an indication of whether each of the recommended problem fix verification procedures 224 was relevant to the current defect. In such embodiments, the output component 226 includes the explicit feedback within the feedback 234 and provides the feedback 234 to the problem fix verification component 165.

In some embodiments, the output component 226 determines implicit feedback on the recommended problem fix verification procedures 224, includes the implicit feedback within the feedback 234, and provides the feedback 234 to the problem fix verification component 165. For example, in some cases, the developer 202 may not respond to the prompt for explicit feedback, but may select one of the recommended problem fix verification procedures 224 as the problem fix verification procedure 228. In such cases, the implicit feedback may include an indication of which of the recommended problem fix verification procedures was selected by the developer 202. In cases where the recommended problem fix verification procedures 224 are ranked (e.g., in descending order from highest recommended problem fix verification procedure to least recommended problem fix verification procedure, or some other ranking order), the implicit feedback may additionally include an indication of the ranking associated with the selected recommended problem fix verification procedure. In other cases, the developer 202 may not select any of the recommended problem fix verification procedures 224 as the problem fix verification procedure 228. In such cases, the implicit feedback may include an indication that none of the recommended problem fix verification procedures 224 was selected by the developer. In these cases, the output component 226 may be configured to compare the problem fix verification procedure 228 to each of the recommended problem fix verification procedures 224, and provide information within the feedback 234 indicating, for each recommended problem fix verification procedure 224, at least one of (i) one or more similarities between the problem fix verification procedure 228 and the recommended problem fix verification procedure 224 or (ii) one or more differences between the problem fix verification procedure 228 and the recommended problem fix verification procedure 224.

The computing system 220 may provide an indication of the problem fix verification procedure 228 to the computing system 230 associated with the fix verification agent 204. In certain embodiments, the computing system 230 may provide an indication of the problem fix verification procedure 228 on a user interface of the computing system 230. The fix verification agent 204 may perform the problem fix verification procedure 228 to verify the correction to the defect of the computing system 210.

In certain embodiments, the fix verification agent may provide, via computing system 230, feedback 232 regarding the problem fix verification procedure 228. For example, the feedback 232 may indicate whether the problem fix verification procedure 228 was correct, or whether additional information is needed (e.g., "more information" request") in order to implement the problem fix verification procedure 228.

The problem fix verification component 165 may use the feedback 232, feedback 234, or a combination thereof, to update one or more weights associated with the recommended problem fix verification procedures 224. For example, as described in greater detail below, the weights may be updated to adjust the ranking of a subsequent set of problem fix verification procedures generated by the problem fix verification component 165.

Note that FIG. 2 provides an illustrative example of a system for generating problem fix verification procedures and that other configurations of such a system are contemplated. For example, while the problem fix verification component 165 and output component 226 are depicted within the computing system 220, in certain embodiments, the problem fix verification component 165 and/or the output component 226 can be implemented by one or more other computing systems (not shown) that are communicatively coupled to the computing system 220. For example, in such embodiments, the problem fix verification component 165 and/or output component 226 may be located within a cloud computing environment and may be accessed by the computing system 220 to perform one or more techniques described herein for generating problem fix verification procedures for verifying corrections to defects.

Figure 3:
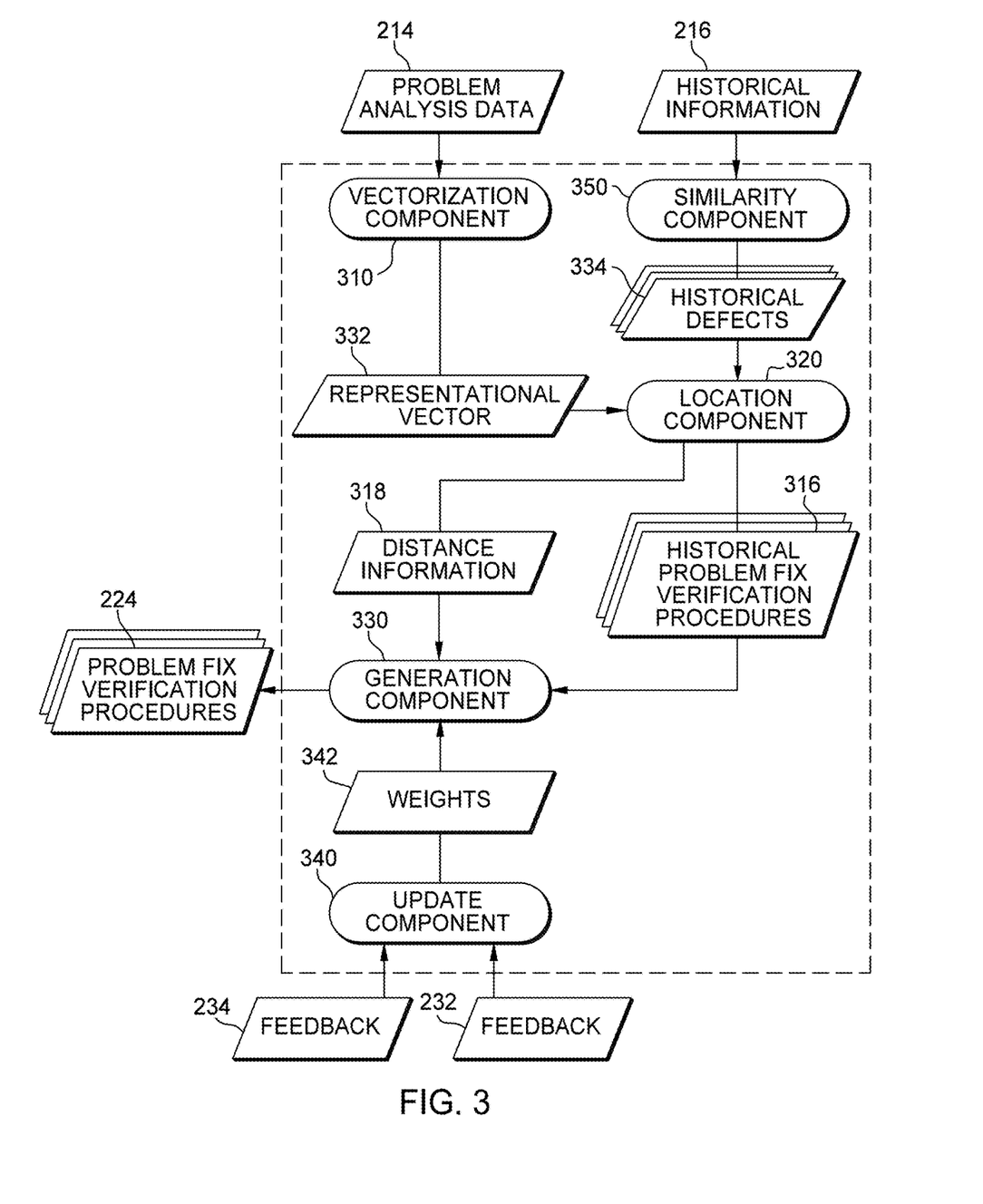
FIG. 3 further illustrates a problem fix verification component of the system illustrated in FIG. 2, according to various embodiments of the present disclosure.

FIG. 3 further illustrates the problem fix verification component 165 of the system 200 illustrated in FIG. 2, according to one embodiment. As shown, the problem fix verification component 165 includes, without limitation, a vectorization component 310, a location component 320, a generation component 330, an update component 340, and a similarity component 350.

In certain embodiments, the vectorization component 310 is configured to generate a representational vector 332 based on the problem analysis data 214. For example, the vectorization component 310 may use a vectorization technique, such as such as bag of words, TF-IDF, and word2vec, to generate the representational vector 332 corresponding to the problem analysis data 214. The vectorization component 310 may provide the representational vector 332 to the location component 320.

In certain embodiments, the similarity component 350 is configured to determine a set of historical defects 334 that is similar to the current defect of the computing system 210, based on the problem analysis data 214, historical information 216, or a combination thereof. The similarity component 350 may generate one or more similarity metrics, based on the problem analysis data 214 and the historical information 216. Each similarity metric may indicate a respective level of similarity between the current defect and a historical defect from the historical information 216.

In certain embodiments, the similarity metrics are generated based on the reference code associated with the current defect and historical reference codes associated with the historical defects from the historical information 216. A reference code may include a first portion (e.g., log class portion) that indicates the component on the computing system 210 that is the source of the current defect and a second portion (e.g., log type portion) that indicates the code region within the component on the computing system 210 that is the source of the current defect. Similarly, each historical reference code may include a first portion (e.g., log class portion) that indicates the component on a computing system that is the source of the historical defect and a second portion (e.g., log type portion) that indicates the code region within the component that is the source of the historical defect. In some cases, a reference code and/or historical reference code may include one or more extensions. The extension can be used to indicate information, such as the failure, hardware component that failed, or other information. In general, each reference code may determine what the associated extension indicates.

In certain embodiments, the similarity component 350 computes a given similarity metric between the current defect and one of the historical defects using the reference code associated with the current defect and the historical reference code associated with the historical defect. For example, the similarity component 350 can associate similar historical defects to the current defect by the first portion of the reference code (e.g., log class) and further utilize the second portion of the reference code (e.g., log type) and extension of the reference code to more granularly associate the historical defects to the current defect. In certain embodiments, the order of prioritization with respect to computing a similarity measure may be the following, from highest to lowest: (1) same reference code and extension, (2) same reference code, (3) same log class and log type, (4) same log class.

In certain embodiments, the similarity component 350 may use additional information to the reference code/historical reference codes to generate the similarity metrics. The additional information may include, for a given current defect and historical defect, without limitation, an indication of "comments in linked defects" for the current defect and "historical comments in linked defects" for the historical defect, an indication of "filed against areas" for the current defect and "historical filed against areas" for the historical defect, an indication of "assigned to who" for the current defect and "historical assigned to who" for the historical defect, and an indication of one or more tags or keywords for the current defect and one or more tags or keywords for the historical defect. In some cases, the aforementioned additional information may be used as secondary inputs to the similarity metric calculation and the reference code may be used as a primary input to the similarity metric calculation.

The similarity component 350 may tokenize the "comments in linked defects"/"historical comments in linked defects" to extract meaningful information indicating particular components, areas, filenames, and additional reference codes associated with the current defect/historical defect. The extracted information can be vectorized using a vectorization technique (e.g., bag of words TF-IDF, etc.), and then can be compared with other vectors using measures, such as cosine similarity or Jaccard similarity, as illustrative examples.

The similarity component 350 may use the "filed against areas" and "historical filed against areas" information to determine if the current defect and historical defect are located in the same areas (e.g., hardware areas). If the areas are the same, then the measure of similarity between the current defect and the historical defect may be increased; otherwise, the measure of similarity between the current defect and the historical defect may be lowered.

The similarity component 350 may use the "assigned to who" and "historical assigned to who" information to determine if the current defect and historical defect were assigned to the same error analysis agent and/or same error analysis team (including multiple error analysis agents). In some cases, the measure of similarity between the current defect and historical defect may be greater with a match on the same error analysis agent as compared to a match on the same error analysis team with a different error analysis agent. If the current defect and historical defect are associated with different error analysis teams, then the measure of similarity between the current defect and the historical defect may be lowered.

The similarity component 350 may use the tags/keywords information to determine if the current defect and historical defect are described using similar words. For example, exact matches in tags/keywords (and/or synonyms to the tags/keywords) may result in higher measures of similarity between the current defect and the historical defect, whereas antonyms between tags/keywords may result in lower measures of similarity between the current defect and the historical defect.

After generating a respective similarity metric for each combination of current defect and historical defect, the similarity component 350 may select, as the set of historical defects 334, a subset of the historical defects with a measure of similarity to the current defect that exceeds a predefined threshold level of similarity. The similarity component 350 may provide the set of historical defects 334 (including corresponding historical representational vectors) to the location component 320.

The location component 320 is generally configured to determine a set of historical problem fix verification procedures 316, based on the set of historical defects 334 (including corresponding historical representational vectors) and the representational vector 332. For example, the location component 320 may compute a respective distance between the representational vector 332 and each historical representational vector using measures, such as cosine similarity or Jaccard similarity, as illustrative examples. The location component 320 may determine a subset of the historical defects 334 that have a respective distance that is less than a threshold distance, and determine corresponding historical problem fix verification procedures 316 for the subset of the historical defects 334. The location component 320 may provide distance information 318 (including the distances between the historical representational vectors (of the subset of the historical defects 334) and the representational vector 332) and the historical problem fix verification procedures 316 to the generation component 330.

The generation component 330 may generate a set of recommended problem fix verification procedures 224, based on the distance information 318 and the historical problem fix verification procedures 316. For example, in certain embodiments, the generation component 330 uses the distance information 318 to rank the historical problem fix verification procedures 316 from lowest distance to highest distance. That is, the recommended problem fix verification procedures 224 may be a ranked version of the historical problem fix verification procedures. In some implementations, the distance information 318 may be used to initialize a set of weights for ranking the historical problem fix verification procedures 316. The generation component 330 may provide the recommended problem fix verification procedures 224 to the output component 226 of the computing system 220.

The update component 340 may obtain feedback 232 and/or feedback 234, and use the feedback 232 and/or feedback 234 to adjust rankings of the recommended problem fix verification procedures 224. As noted, the feedback 234 may include explicit and/or implicit feedback regarding the recommended problem fix verification procedures 224. For example, the problem fix verification component 165 may prompt the developer 202 on whether the recommended problem fix verification procedures 224 were relevant to the current defect, and the update component 340 may receive explicit feedback within feedback 234 indicating whether the recommended problem fix verification procedures 224 were relevant. In some cases, if the developer 202 provides explicit feedback indicating that none of the recommended problem fix verification procedures 224 was used, the developer 202 can indicate, within feedback 234, which of the features was not relevant to the current defect. In yet other cases, the feedback 234 may include implicit feedback indicating which of the recommended problem fix verification procedures 224 was selected as the problem fix verification procedure 228. For example, if the developer 202 selects a recommended problem fix verification procedure at the bottom of the list, then the feedback 234 may implicitly indicate that the selected recommended problem fix verification procedure was more relevant to the current defect than another recommended problem fix verification procedure at the top of the list, for example.

The feedback 232 may include explicit and/or implicit feedback regarding the problem fix verification procedure 228. For example, if the fix verification agent 204 is given an invalid problem fix verification procedure 228, the fix verification agent 204 may provide feedback 232 indicating the problem fix verification procedure 228 was invalid along with a set of features within the problem fix verification procedure 228 that were invalid. Conversely, if the fix verification agent 204 is given a problem fix verification procedure 228 that was not included within the recommended problem fix verification procedures 224 and the fix verification agent 204 accepts the problem fix verification procedure 228, then the fix verification agent 204 may provide feedback 232 indicating the problem fix verification procedure 228 was accepted.

The update component 340 can use the feedback 234, feedback 232, or a combination thereof, to provide a set of updated weights 342 to the generation component 330. The generation component 330 may use the updated weights 342 for ranking another set of historical problem fix verification procedures 316. For example, if the feedback 234 indicates that the developer 202 selected a problem fix verification procedure 228 at the bottom of the recommended problem fix verification procedures 224, then the updated weights 342 may allow the generation component 330 to increase the ranking of the selected problem fix verification procedure within subsequent problem fix verification procedures that are generated for similar defects to the current defect. On the other hand, if the developer 202 uses a problem fix verification procedure 228 that is not included within the recommended problem fix verification procedures 224 and the problem fix verification procedure 228 is accepted by the fix verification agent 204, then the updated weights 342 may allow the generation component 330 to decrease the rankings of the recommended problem fix verification procedures 224 for subsequent problem fix verification procedures that are generated for similar defects to the current defect, as well as include the problem fix verification procedure 228 within subsequent problem fix verification procedures that are generated for similar defects to the current defect.

Figure 4:
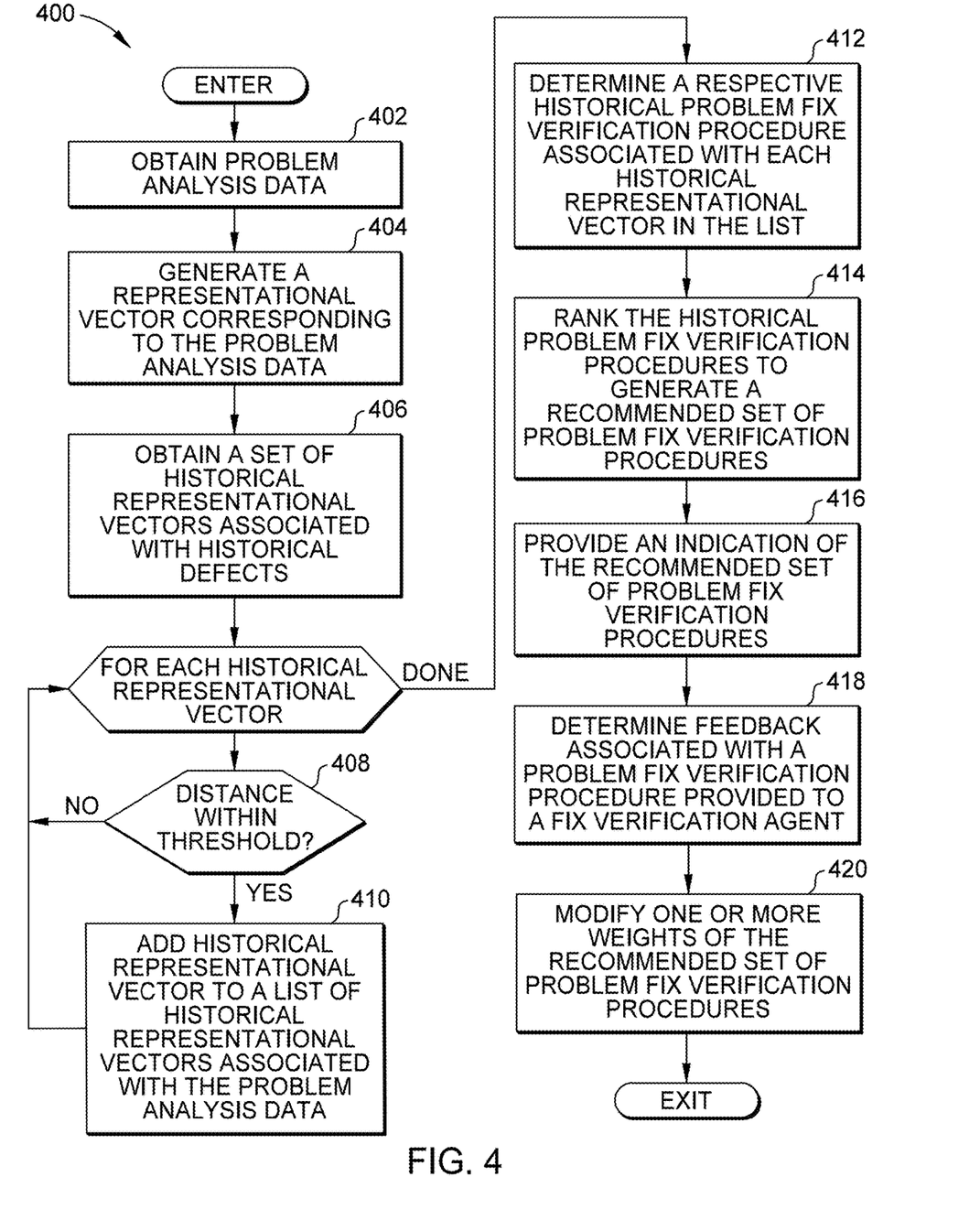
FIG. 4 is a flowchart of a method for generating problem fix verification procedures, according to various embodiments of the present disclosure.

FIG. 4 is a flowchart of a method 400 for generating problem fix verification procedures for verifying corrections to defects, according to one embodiment. The method 400 may be performed by a problem fix verification component (e.g., problem fix verification component 165).

Method 400 may enter at block 402, where the problem fix verification component obtains problem analysis data (e.g., problem analysis data 214) associated with a defect of a first computing system (e.g., computing system 210).

At block 404, the problem fix verification component generates a representational vector (e.g., representational vector 332) corresponding to the problem analysis data.

At block 406, the problem fix verification component obtains a set of historical representational vectors associated with historical defects (e.g., historical defects 334) that are similar to the defect of the first computing system.

Blocks 408 and/or 410 may be performed for each historical representational vector. At block 408, the problem fix verification component determines whether the distance between the historical representational vector and the representational vector is within a threshold. If so, then, at block 410, the problem fix verification component adds the historical representational vector to a list of historical representational vectors associated with the problem analysis data. If not, then the problem fix verification component evaluates the next historical representational vector (if available).

At block 412, the problem fix verification component determines a respective historical problem fix verification procedure (e.g., historical problem fix verification procedure 316) associated with each historical representational vector in the list.

At block 414, the problem fix verification component ranks the historical problem fix verification procedures to generate a recommended set of problem fix verification procedures (e.g., recommended problem fix verification procedures 224).

At block 416, the problem fix verification component provides an indication of the recommended set of problem fix verification procedures, e.g., on a user interface of the computing system 220.

At block 418, the problem fix verification component determines feedback (e.g., feedback 232, feedback 234, or a combination thereof) associated with a problem fix verification procedure (e.g., problem fix verification procedure 228) provided to a fix verification agent (e.g., fix verification agent 204).

At block 420, the problem fix verification component modifies one or more weights (e.g., weights 342) of the recommended set of problem fix verification procedures.

Figure 5:
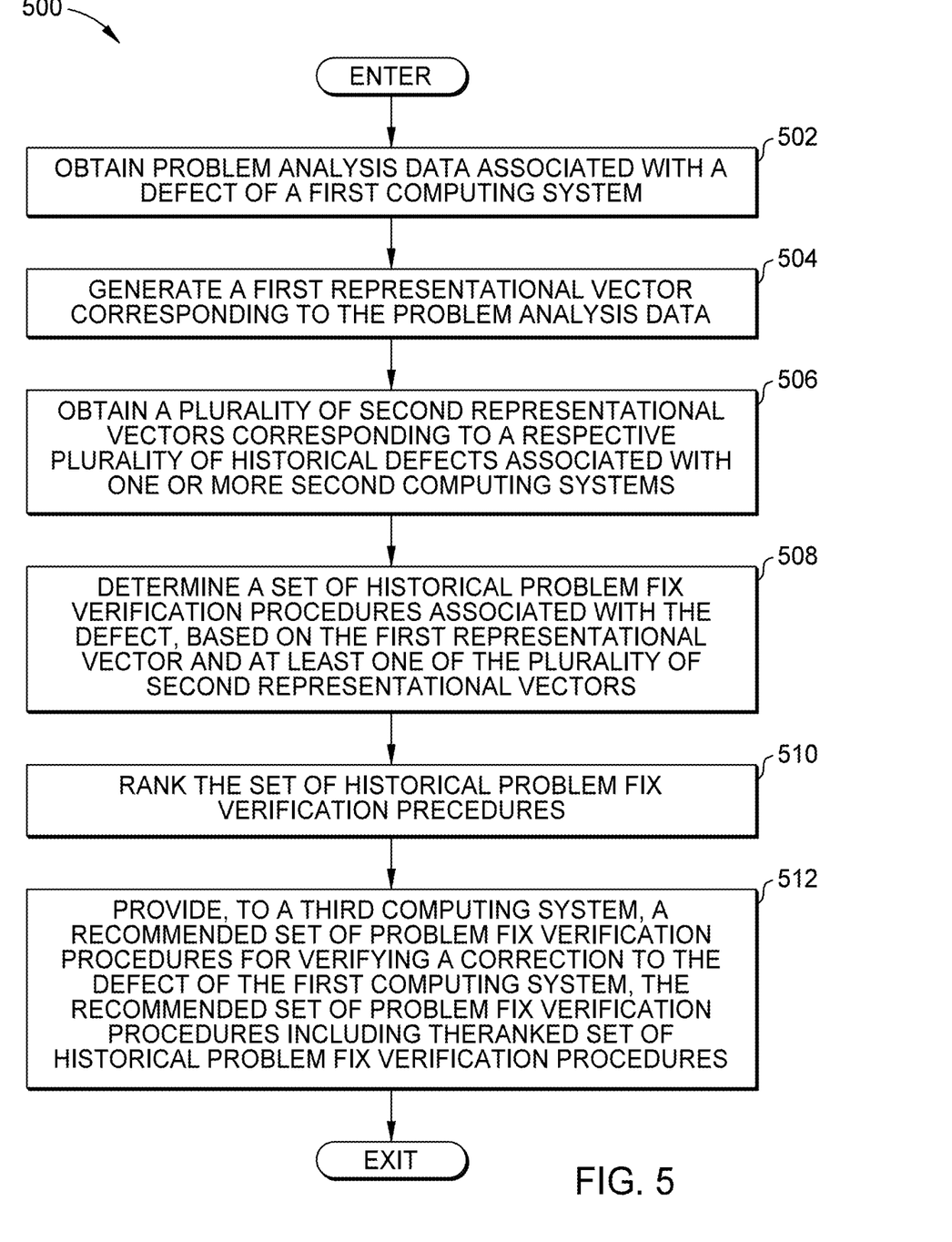
FIG. 5 is a flowchart of another method for generating problem fix verification procedures, according to various embodiments of the present disclosure.

FIG. 5 is a flowchart of a method 500 for generating problem fix verification procedures for verifying corrections to defects, according to one embodiment. The method 500 may be performed by a problem fix verification component (e.g., problem fix verification component 165).

Method 500 may enter at block 502, where the problem fix verification component obtains problem analysis data (e.g., problem analysis data 214) associated with a defect of a first computing system (e.g., computing system 210).

At block 504, the problem fix verification component generates a first representational vector (e.g., representational vector 332) corresponding to the problem analysis data.

At block 506, the problem fix verification component obtains a plurality of second representational vectors corresponding to a respective plurality of historical defects (e.g., historical defects 334) associated with one or more second computing systems.

At block 508, the problem fix verification component determines a set of historical problem fix verification procedures (e.g., historical problem fix verification procedures 316) associated with the defect, based on the first representational vector and at least one of the plurality of second representational vectors.

At block 510, the problem fix verification component ranks the set of historical problem fix verification procedures, based at least in part on at least one metric (e.g., distance information 318) associated with the first representational vector and the at least one of the plurality of second representational vectors.

At block 512, the problem fix verification component provides, to a third computing system (e.g., computing system 220 associated with developer 202), an indication of a recommended set of problem fix verification procedures (e.g., recommended problem fix verification procedures 224) for verifying a correction to the defect of the first computing system. The recommended set of problem fix verification procedures include the ranked set of historical problem fix verification procedures.

In some embodiments, the developer 202 may select one of the recommended set of problem fix verification procedures, and send, via the third computing system, an indication of the selected problem fix verification procedure (e.g., problem fix verification procedure 228) to a fourth computing system (e.g., computing system 230) associated with a fix verification agent 204. The fix verification agent 204 may perform the steps associated with the selected problem fix verification procedure to verify the correction to the defect of the first computing system.

Figure 6:
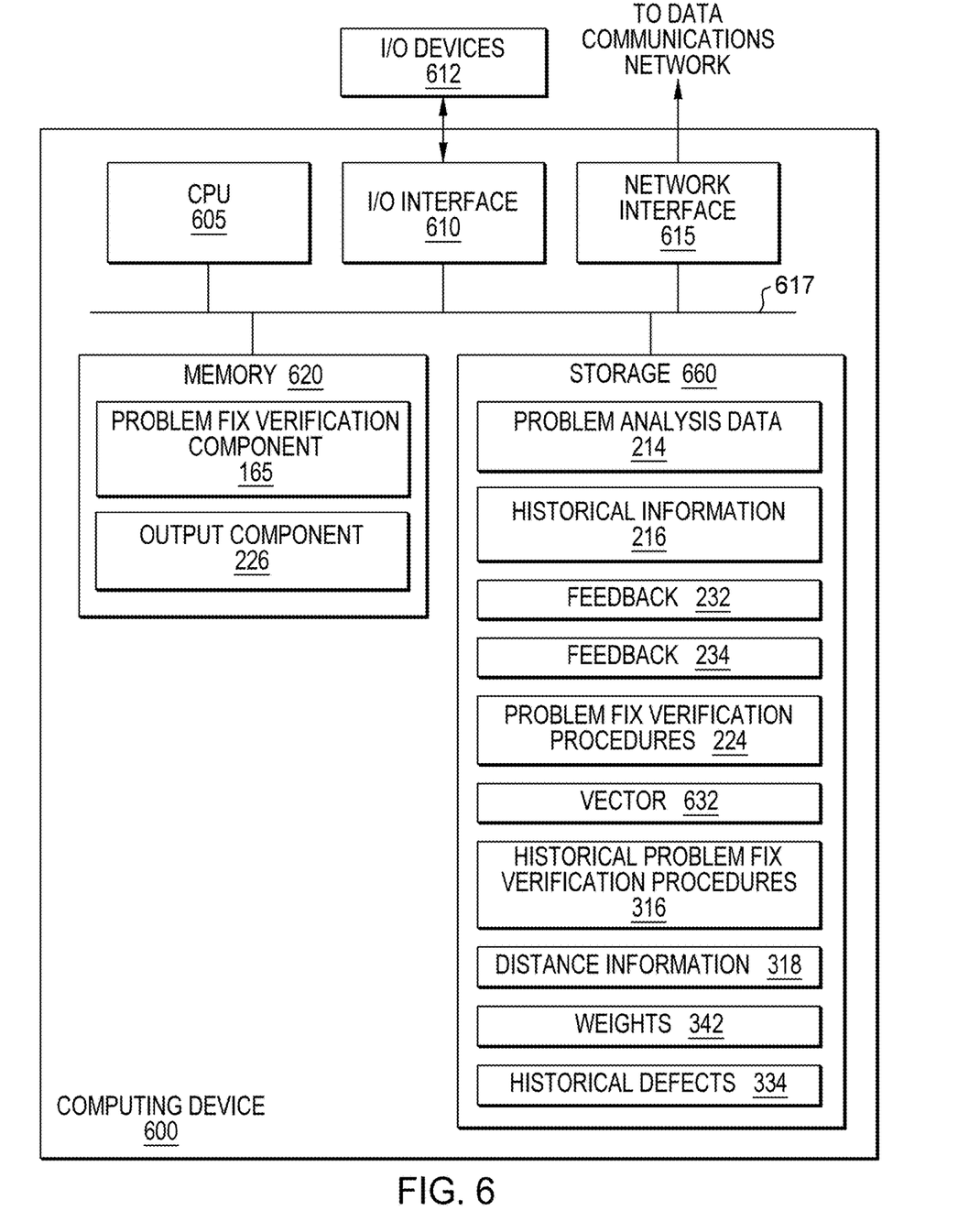
FIG. 6 illustrates an example computing device, according to various embodiments of the present disclosure.

FIG. 6 illustrates an example computing device 600 configured to generate problem fix verification procedures for verifying corrections to defects, according to certain embodiments. In certain embodiments, the computing device 600 may be representative of computing system 220. In certain embodiments, the computing device 600 may be configured to perform method 400 illustrated in FIG. 4, method 500 illustrated in FIG. 5, or any other technique or combination of techniques described herein.

As shown, the computing device 600 includes, without limitation, a central processing unit (CPU) 605, a network interface 615, a memory 620, and storage 660, each connected to a bus 617. The computing device 600 may also include an I/O device interface 610 connecting I/O devices 612 (e.g., keyboard, display and mouse devices) to the computing device 600. The computing device 600 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used.

The CPU 605 retrieves and executes programming instructions stored in the memory 620 as well as stored in the storage 660. The bus 617 is used to transmit programming instructions and application data between the CPU 605, I/O device interface 610, storage 660, network interface 615, and memory 620. Note, CPU 605 is included to be representative of a single CPU, multiple CPUs, a single CPU having multiple processing cores, and the like, and the memory 620 is generally included to be representative of a random access memory. The storage 660 may be a disk drive or flash storage device. Although shown as a single unit, the storage 660 may be a combination of fixed and/or removable storage devices, such as fixed disc drives, removable memory cards, optical storage, network attached storage (NAS), or a storage area-network (SAN).

Illustratively, the memory 620 includes the problem fix verification component 165 and the output component 226, which are discussed in greater detail above. Further, storage 660 includes problem analysis data 214, historical information 216, feedback 232, feedback 234, problem fix verification procedures 224, vectors 632 (including representational vectors 332 and historical representational vectors, or a combination thereof), well as historical problem fix verification procedures 316, distance information 318, weights 342, historical defects 334, or any combination thereof, which are also discussed in greater detail above. Note, while FIG. 6 depicts the problem fix verification component 165 and the output component 226 within memory 620, which is generally representative of volatile memory (e.g., random access memory), in certain embodiments, the problem fix verification component 165 and the output component 226 are included in persistent (e.g., non-volatile) memory or persistent (e.g., non-volatile) storage, such as persistent storage 113 of computer 101 depicted in FIG. 1 or storage 660 of FIG. 6.

As used herein, "a processor," "at least one processor," or "one or more processors" generally refer to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refer to a single memory configured to store data and/or instructions or multiple memories configured to collectively store data and/or instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method comprising:
obtaining problem analysis data associated with a defect of a first computing system;
generating a first representational vector corresponding to the problem analysis data;
obtaining a plurality of second representational vectors corresponding to a respective plurality of historical defects associated with one or more second computing systems;
determining a set of historical problem fix verification procedures associated with the defect, based on the first representational vector and at least one of the plurality of second representational vectors, each historical problem fix verification procedure of the set of historical problem fix verification procedures indicating a respective set of instructions for verifying a correction to at least one of the plurality of historical defects;
ranking the set of historical problem fix verification procedures, based at least in part on at least one metric associated with the first representational vector and the at least one of the plurality of second representational vectors; and
providing, to a third computing system, an indication of a recommended set of problem fix verification procedures for verifying a correction to the defect of the first computing system, the recommended set of problem fix verification procedures comprising the ranked set of historical problem fix verification procedures.

2. The computer-implemented method of claim 1, wherein the problem analysis data comprises an indication of a reference code associated with the defect of the first computing system and an extension associated with the reference code.

3. The computer-implemented method of claim 2, further comprising determining, from the plurality of historical defects, a set of historical defects associated with the defect of the first computing system, based at least in part on the reference code and the extension.

4. The computer-implemented method of claim 3, wherein determining the set of historical defects comprises:
generating a plurality of metrics, based on at least one of (i) a first portion of the reference code, (ii) a second portion of the reference code, or (iii) the extension, each metric indicating a respective level of similarity between the defect and each of the plurality of historical defects; and
selecting, as the set of historical defects, a subset of the plurality of historical defects each having a threshold level of similarity to the defect.

5. The computer-implemented method of claim 4, wherein:

the first portion of the reference code indicates a code component of the first computing system that is a source of the defect;
the second portion of the reference code indicates a code region within the code component that is the source of the defect; and
the extension of the reference code indicates at least one of the defect or a hardware component within the first computing system associated with the defect.

6. The computer-implemented method of claim 4, wherein:
the first portion of the reference code comprises a log class element; and
the second portion of the reference code comprises a log type element.

7. The computer-implemented method of claim 4, wherein a first historical defect of the set of historical defects as a higher level of similarity to the defect than a second historical defect of the set of historical defects when (i) the first historical defect has a same reference code and a same extension as the defect and (ii) the second historical defect has at least one of a same reference code as the defect, a same first portion and same second portion of the reference code as the defect, or a same first portion of the reference code as the defect.

8. The computer-implemented method of claim 4, wherein a first historical defect of the set of historical defects as a higher level of similarity to the defect than a second historical defect of the set of historical defects when (i) the first historical defect has a same reference code as the defect and (ii) the second historical defect has at least one of a same first portion and same second portion of the reference code as the defect or a same first portion of the reference code as the defect.

9. The computer-implemented method of claim 4, wherein a first historical defect of the set of historical defects as a higher level of similarity to the defect than a second historical defect of the set of historical defects when (i) the first historical defect has a same first portion and same second portion of reference code as the defect and (ii) the second historical defect has at least one of a same first portion of the reference code as the defect.

10. The computer-implemented method of claim 4, wherein:
the problem analysis data further comprises information indicating at least one of (i) one or more comments in at least one file associated with the defect, (ii) an area within the first computing system associated with the defect, (iii) an identifier of a user assigned to resolve the defect, or (iv) one or more keywords associated with the defect; and
the plurality of metrics are generated further based on the information.

11. The computer-implemented method of claim 1, further comprising:
obtaining feedback associated with the recommended set of problem fix verification procedures; and
adjusting one or more weights associated with at least one of the recommended set of problem fix verification procedures, based on the feedback.

12. The computer-implemented method of claim 11, further comprising transmitting a request for the feedback to the third computing system, wherein obtaining the feedback comprises receiving, from the third computing system, a response comprising the feedback.

13. The computer-implemented method of claim 11, wherein obtaining the feedback comprises determining which of the recommended set of problem fix verification procedures has been selected by a user of the third computing system.

14. The computer-implemented method of claim 11, wherein the feedback comprises an indication of a problem fix verification procedure that is not included within the recommended set of problem fix verification procedures.

15. A first computing system comprising:
one or more memories collectively storing executable instructions; and
one or more processors communicatively coupled to the one or more memories, the one or more processors being collectively configured to execute the executable instructions and cause the first computing system to perform an operation comprising:
obtaining problem analysis data associated with a defect of a second computing system;
generating a first representational vector corresponding to the problem analysis data;
obtaining a plurality of second representational vectors corresponding to a respective plurality of historical defects associated with one or more third computing systems;
determining a set of historical problem fix verification procedures associated with the defect, based on the first representational vector and at least one of the plurality of second representational vectors, each historical problem fix verification procedure of the set of historical problem fix verification procedures indicating a respective set of instructions for verifying a correction to at least one of the plurality of historical defects;
ranking the set of historical problem fix verification procedures, based at least in part on at least one metric associated with the first representational vector and the at least one of the plurality of second representational vectors; and
providing, to a fourth computing system, an indication of a recommended set of problem fix verification procedures for verifying a correction to the defect of the second computing system, the recommended set of problem fix verification procedures comprising the ranked set of historical problem fix verification procedures.

16. The first computing system of claim 15, wherein the problem analysis data comprises an indication of a reference code associated with the defect of the second computing system and an extension associated with the reference code.

17. The first computing system of claim 16, wherein the operation further comprises determining, from the plurality of historical defects, a set of historical defects associated with the defect of the first computing system, based at least in part on the reference code and the extension.

18. The first computing system of claim 17, wherein determining the set of historical defects comprises:
generating a plurality of metrics, based on at least one of (i) a first portion of the reference code, (ii) a second portion of the reference code, or (iii) the extension, each metric indicating a respective level of similarity between the defect and each of the plurality of historical defects; and
selecting, as the set of historical defects, a subset of the plurality of historical defects each having a threshold level of similarity to the defect.

19. The first computing system of claim 18, wherein:
the problem analysis data further comprises information indicating at least one of (i) one or more comments in at least one file associated with the defect, (ii) an area within the second computing system associated with the defect, (iii) an identifier of a user assigned to resolve the defect, or (iv) one or more keywords associated with the defect; and the plurality of metrics are generated further based on the information.

20. A computer-readable storage medium having computer-readable program code embodied therewith, the computer-readable program code collectively executable by one or more computer processors to perform an operation comprising:

obtaining problem analysis data associated with a defect of a first computing system;

generating a first representational vector corresponding to the problem analysis data;

obtaining a plurality of second representational vectors corresponding to a respective plurality of historical defects associated with one or more second computing systems;

determining a set of historical problem fix verification procedures associated with the defect, based on the first representational vector and at least one of the plurality of second representational vectors, each historical problem fix verification procedure of the set of historical problem fix verification procedures indicating a respective set of instructions for verifying a correction to at least one of the plurality of historical defects;

ranking the set of historical problem fix verification procedures, based at least in part on at least one metric associated with the first representational vector and the at least one of the plurality of second representational vectors; and providing, to a third computing system, an indication of a recommended set of problem fix verification procedures for verifying a correction to the defect of the first computing system, the recommended set of problem fix verification procedures comprising the ranked set of historical problem fix verification procedures.

* * * * *